US007887025B2

(12) United States Patent
Hartman et al.

(10) Patent No.: US 7,887,025 B2
(45) Date of Patent: Feb. 15, 2011

(54) BALL VALVE HOUSING SEAT AND METHOD OF SECURING THE SAME TO A BALL VALVE

(76) Inventors: Thomas A. Hartman, 700 Capac Ct., St. Louis, MO (US) 63125; Brian T. Hartman, 2253 E. Contessa Cir., Mesa, AZ (US) 85213

( * ) Notice: Subject to any disclaimer, the term of this patent is extended or adjusted under 35 U.S.C. 154(b) by 220 days.

(21) Appl. No.: 11/951,798

(22) Filed: Dec. 6, 2007

(65) Prior Publication Data
US 2009/0146093 A1    Jun. 11, 2009

(51) Int. Cl.
F16K 5/06    (2006.01)
(52) U.S. Cl. ............... 251/315.1; 251/316; 251/363
(58) Field of Classification Search ............ 251/314, 251/316, 317, 317.01, 359, 360, 363, 315.01, 251/315.1
See application file for complete search history.

(56) References Cited

U.S. PATENT DOCUMENTS

| | | | |
|---|---|---|---|
| 2,754,136 A | 7/1956 | Phillips | |
| 2,762,601 A | 9/1956 | Clade | |
| 3,314,642 A | 4/1967 | Kautz | |
| 3,356,333 A | 12/1967 | Scaramucci | |
| 3,356,336 A | 12/1967 | Maenaka | |
| 3,401,916 A | 9/1968 | Scaramucci | |
| 3,462,120 A | 8/1969 | Priese | |
| 3,504,886 A | 4/1970 | Hulslander et al. | |
| 3,529,619 A | 9/1970 | Drewry et al. | |
| 3,540,696 A | 11/1970 | Fawkes | |
| 3,544,066 A | 12/1970 | Fawkes | |
| 3,550,906 A | 12/1970 | Mayers | |
| 3,563,510 A | 2/1971 | Priese | |
| 3,591,133 A | 7/1971 | Miles et al. | |
| 3,713,660 A | 1/1973 | Luthe | |
| 3,726,503 A | 4/1973 | Fawkes | |
| 3,780,986 A | 12/1973 | Fujiwara | |
| 3,799,501 A | 3/1974 | Hartman | |
| 3,910,555 A | 10/1975 | Bertrem et al. | |
| 3,958,314 A | 5/1976 | Kurkjian, Jr. | |
| 4,006,882 A | 2/1977 | Bonafous | |
| 4,006,883 A | 2/1977 | Hillsheimer | |
| 4,023,773 A | 5/1977 | Wise | |
| 4,034,959 A * | 7/1977 | Morrison ............... 251/364 |
| 4,063,709 A | 12/1977 | Lorthiois | |
| 4,083,529 A | 4/1978 | Santy et al. | |
| 4,174,557 A | 11/1979 | Goto et al. | |
| 4,175,578 A | 11/1979 | Priese | |

(Continued)

Primary Examiner—John Bastianelli
(74) Attorney, Agent, or Firm—Thompson Coburn LLP; Clyde L. Smith (57) ABSTRACT

A valve comprises a housing, an annular housing seat, and a gate. The housing comprises a fluid inlet and a fluid outlet. The housing seat is fixed in position relative to the housing via epoxy. The gate comprises a gate seat and a fluid passageway that extends through the gate. The gate is movable relative to the housing between an open position and a closed position. The gate is also configured to allow fluid to flow from the fluid inlet through the fluid passageway to the fluid outlet when the gate is in the open position, and configured such that the gate seat engages the housing seat in a manner preventing fluid from flowing from the fluid inlet to the fluid outlet when the gate is in the closed position.

13 Claims, 7 Drawing Sheets

U.S. PATENT DOCUMENTS

| | | | |
|---|---|---|---|
| 4,202,365 A | 5/1980 | Aoki et al. | |
| 4,266,754 A | 5/1981 | Ninomiya et al. | |
| 4,281,817 A | 8/1981 | Adams et al. | |
| 4,293,116 A | 10/1981 | Hinrichs | |
| 4,304,392 A | 12/1981 | Maciulaitis | |
| 4,420,140 A | 12/1983 | Gachot | |
| 4,508,315 A | 4/1985 | Livorsi et al. | |
| 4,515,347 A | 5/1985 | Sitton et al. | |
| 4,632,360 A | 12/1986 | DeSalve | |
| 4,635,945 A | 1/1987 | Beck | |
| 4,712,768 A | 12/1987 | Herr et al. | |
| 4,770,393 A | 9/1988 | Hubertson | |
| 4,826,133 A | 5/1989 | Hiltebrand | |
| 4,843,187 A * | 6/1989 | Johnson | 251/364 |
| 4,883,253 A | 11/1989 | Hashimoto et al. | |
| 4,899,775 A | 2/1990 | Calvin | |
| 4,988,076 A | 1/1991 | Burton | |
| 4,993,720 A | 2/1991 | Ciotola | |
| 5,071,140 A | 12/1991 | Quevedo Del Rio | |
| 5,139,042 A * | 8/1992 | Calhoun | 251/359 |
| 5,158,265 A | 10/1992 | Miyairi | |
| 5,263,444 A | 11/1993 | Prior et al. | |
| 5,284,182 A | 2/1994 | McLennan | |
| 5,634,626 A | 6/1997 | Hartman | |
| 5,692,758 A | 12/1997 | Wikstrom | |
| 5,735,047 A * | 4/1998 | Evans et al. | 29/890.13 |
| 6,202,983 B1 | 3/2001 | Hartman et al. | |
| 6,206,376 B1 | 3/2001 | Hartman et al. | |
| 6,217,002 B1 * | 4/2001 | Shafer | 251/314 |
| 6,494,466 B1 | 12/2002 | Hartman et al. | |
| 6,669,171 B1 * | 12/2003 | Stunkard | 251/315.14 |
| 7,225,825 B1 | 6/2007 | Hartman et al. | |

* cited by examiner

BALL VALVE HOUSING SEAT AND METHOD OF SECURING THE SAME TO A BALL VALVE

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to industrial ball valves. More particularly, this invention pertains to the use of epoxy to secure the housing seat to the housing of a ball valve.

2. Related Art

Various types of valve seats are utilized in ball valves. In most ball valves, an annular housing seat is fixed in position relative to the housing of the valve. The housing seat is configured to engage against a portion of a pivotally movable plug or gate when the gate is in the closed position. In large industrial ball valves, the housing seat is typically a replaceable part. When installing a housing seat within a large industrial ball valve, either as an original or replacement seat, it is often necessary to perform a step of adjusting the alignment of the housing seat to ensure that full annular contact is made between the housing seat and gate seat when the gate seat in the closed position. Adjustment may also be necessary to ensure that there is sufficient and uniform compressive contact pressure such that, at full head pressure, fluid will not pass between the seals. To this end, it is known to align the housing seat relative to the housing using a plurality of pushing and pulling screws spaced circumferentially around the annular housing seat. The pushing and pulling screws allow the housing seat, which is typically metal, to be slightly deformed and allow for subtle changes in the orientation of the housing seat relative to the housing. This allows for the adjustment of the contact area and pressure between the housing seat and the gate seat. Once the housing seat is aligned, the screws are locked in place and the ball valve can be put into service.

While the above-mentioned method of aligning and supporting a housing seat within a ball valve has utility, there are some disadvantages to such prior art methods. A primary disadvantage is that the screws exert non-uniform loads on the housing seat and, as a result, over time tend to cause the sealing surface of the housing seat to warp as a result of the uneven loading exerted thereupon. While such warpage may be slight and, at least initially, does not affect the sealing capability of the ball valve, it can lead to premature seal failure.

SUMMARY OF THE INVENTION

The present invention utilizes epoxy to secure a housing seat of a ball valve to the housing in a manner supporting the housing seat evenly around its circumference. In a first aspect of the invention, a valve comprises a housing, an annular housing seat, and a gate. The housing comprises a fluid inlet and a fluid outlet. The housing seat is fixed in position relative to the housing via epoxy. The gate comprises a gate seat and a fluid passageway that extends through the gate. The gate is movable relative to the housing between an open position and a closed position. The gate is also configured to allow fluid to flow from the fluid inlet through the fluid passageway to the fluid outlet when the gate is in the open position, and configured such that the gate seat engages the housing seat in a manner preventing fluid from flowing from the fluid inlet to the fluid outlet when the gate is in the closed position.

In another aspect of the invention, a method comprises a step of positioning a housing seat within a valve. The valve comprises a housing and a gate. The housing comprises a fluid inlet and a fluid outlet. The gate comprises a gate seat and a fluid passageway, and is movable relative to the housing between an open position and a closed position. The gate is configured to allow fluid to flow from the fluid inlet through the fluid passageway to the fluid outlet when the gate is in the open position. The positioning step comprises moving the housing seat to a sealing position relative to the housing via the use of adjusting screws that connect the housing seat to the housing. The method further comprises a step of securing the housing seat in the sealing position relative to the housing via epoxy. The gate is configured such that the gate seat engages the housing seat in a manner preventing fluid from flowing from the fluid inlet to the fluid outlet when the gate is in the closed position and the housing seat is in the sealing position.

Further features and advantages of the present invention, as well as the operation of an embodiment of the present invention, are described in detail below with reference to the accompanying drawings.

Reference numerals in the written specification and in the drawing figures indicate corresponding items.

DETAILED DESCRIPTION OF THE PREFERRED EMBODIMENT

A ball valve in accordance with the invention is shown in FIGS. 1-4, and is generally indicated by the reference numeral 10. The ball valve comprises a plug or gate 12, a housing 14, and a housing seat 16.

The gate 12 comprises a pair of shafts 18, a gate seat 20, and a fluid passageway 22 that extends through the gate. The shafts 18 are aligned and pivotally attached the gate 12 to the housing 14 in a manner such that the gate can pivotally move between an open position (shown in FIG. 3) and a closed position (shown in FIG. 4) by applying a torque on at least one of the shafts 18. The gate seat 20 preferably has an annular sealing surface 24 that is adapted to engage the housing seat 16 in a manner preventing the flow of fluid through the valve 10 when the gate 12 is in the closed position. The gate seat 20 can be formed of various materials including, but not limited to, metals and polymeric materials. In the case where the sealing surface 24 is formed of a relatively rigid material, such as metal, the gate seat 20 may be attached to the remainder of the gate 12 via a relatively resilient member to ensure that the sealing surface does not warp as a result of its attachment to the reminder of the gate. This also provides a resiliency to the gate seat 20 that facilitates an even seal. Preferably, the sealing surface 24 has the contour of a partial sphere. The fluid passageway 22 is configured to channel fluid in an unobstructed manner through the gate 12 along a path that is oriented generally perpendicular to the axis about which the gate pivots, when the gate is in the opened position.

The housing 14 houses the gate 12 and ultimately is attached to either of or both a downstream fluid conduit and an upstream fluid conduit (not shown). The housing 14 comprises a fluid inlet 26 and a fluid outlet 28 for the ingress and egress of fluid that passes through the housing. It should be appreciated however that the valve 10 could in some cases operate in reverse and the fluid inlet 26 and fluid outlet 28 can serve as each other. The housing 14 also comprises a housing seat retainer 30, an inspection/service hatch cover 32, and shaft sleeves 34. The inspection/service hatch cover 32 can be removed to allow a person to inspect or service the valve, such as to change the gate seat 20, without removing the valve 10 from a fluid line. The shaft sleeves support the shafts 18 of the gate 12 and comprise internal O-rings (not shown) which sealably engage against the shafts to prevent fluid from escaping the housing 14 through the shaft openings.

Figure 1:
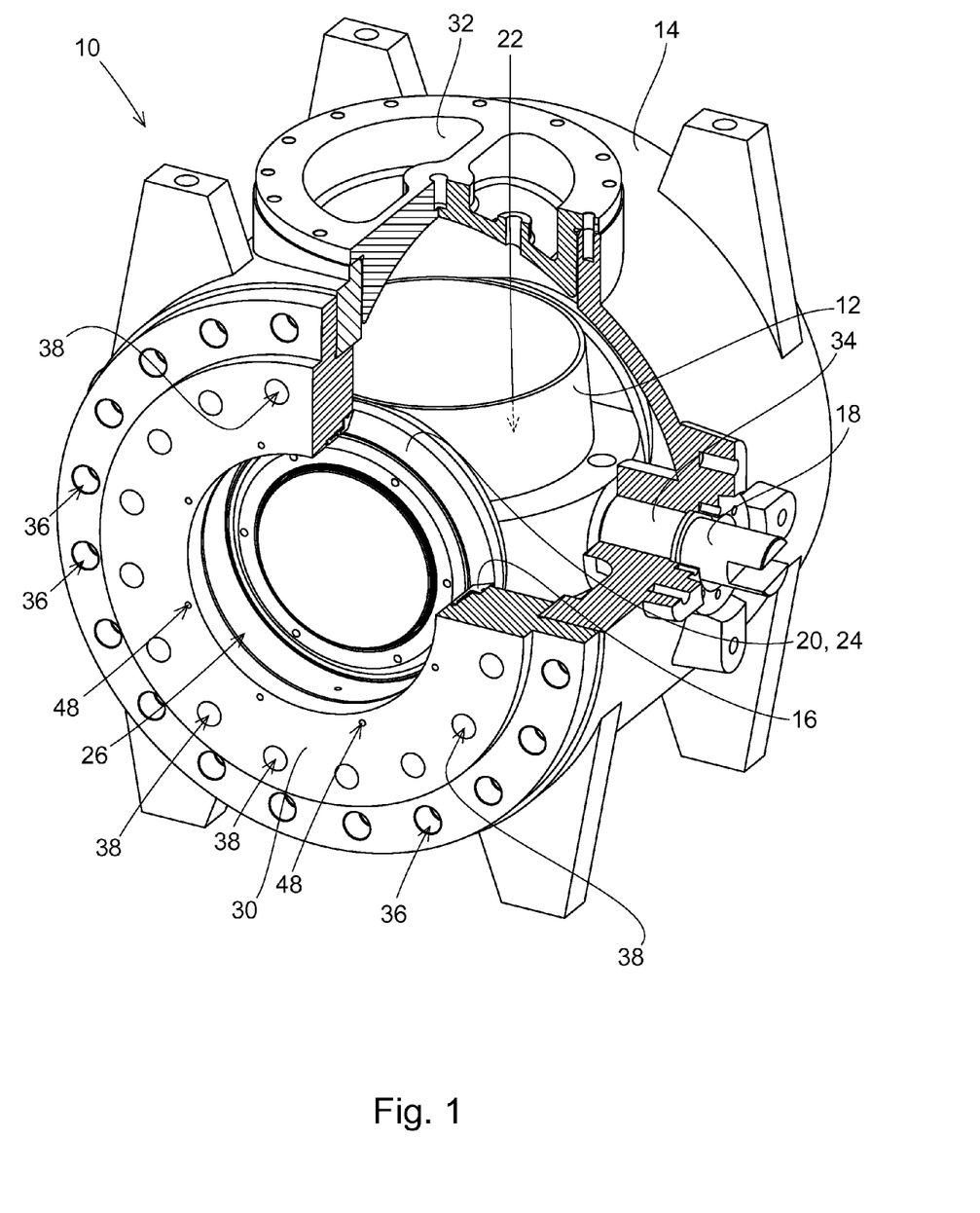
FIG. 1 illustrates a breakaway perspective view of a ball valve in accordance with the invention, and is shown with its gate in the closed position.
Figure 2:
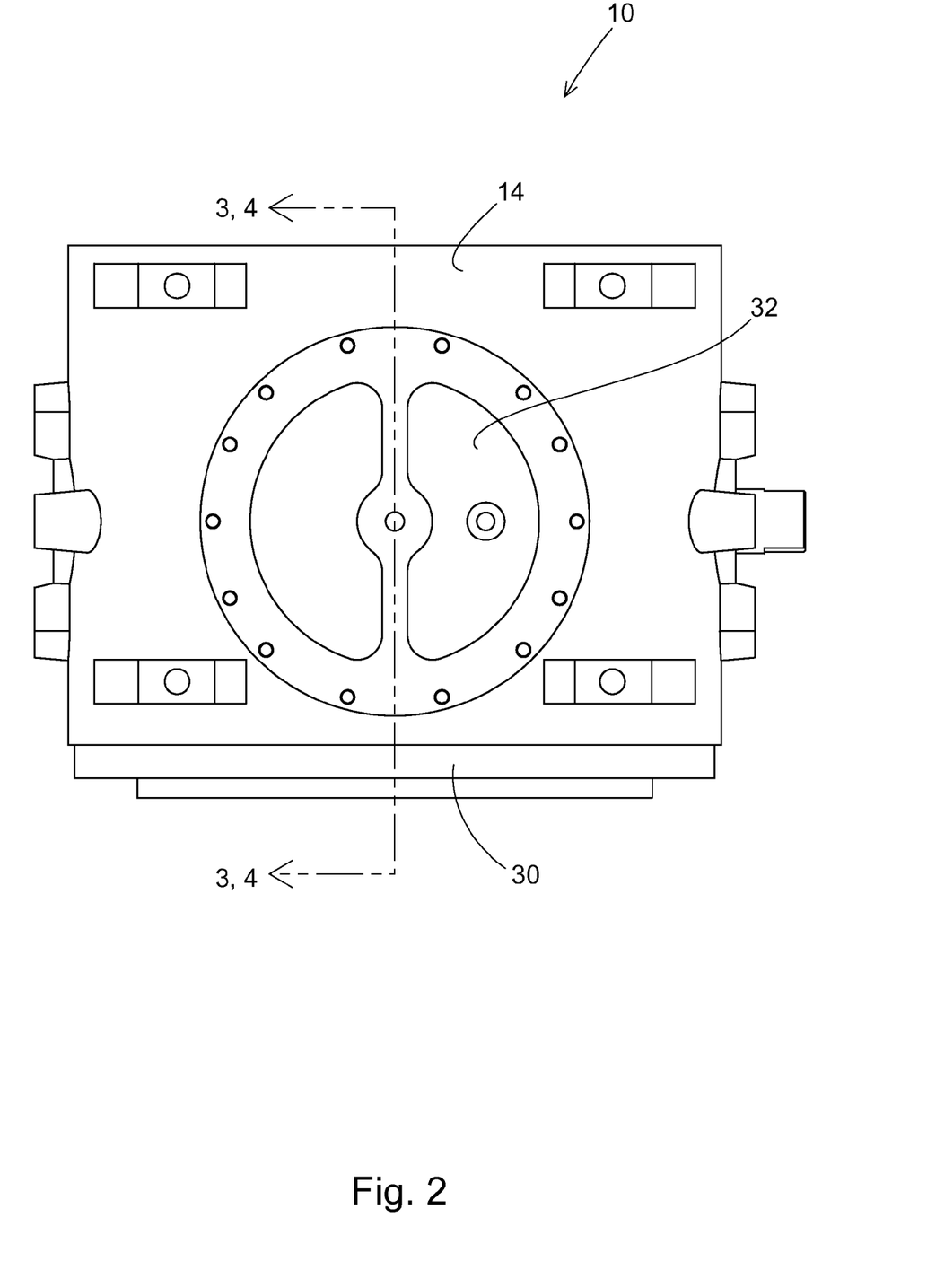
FIG. 2 illustrates a top view of the ball valve shown in FIG. 1.
Figure 3:
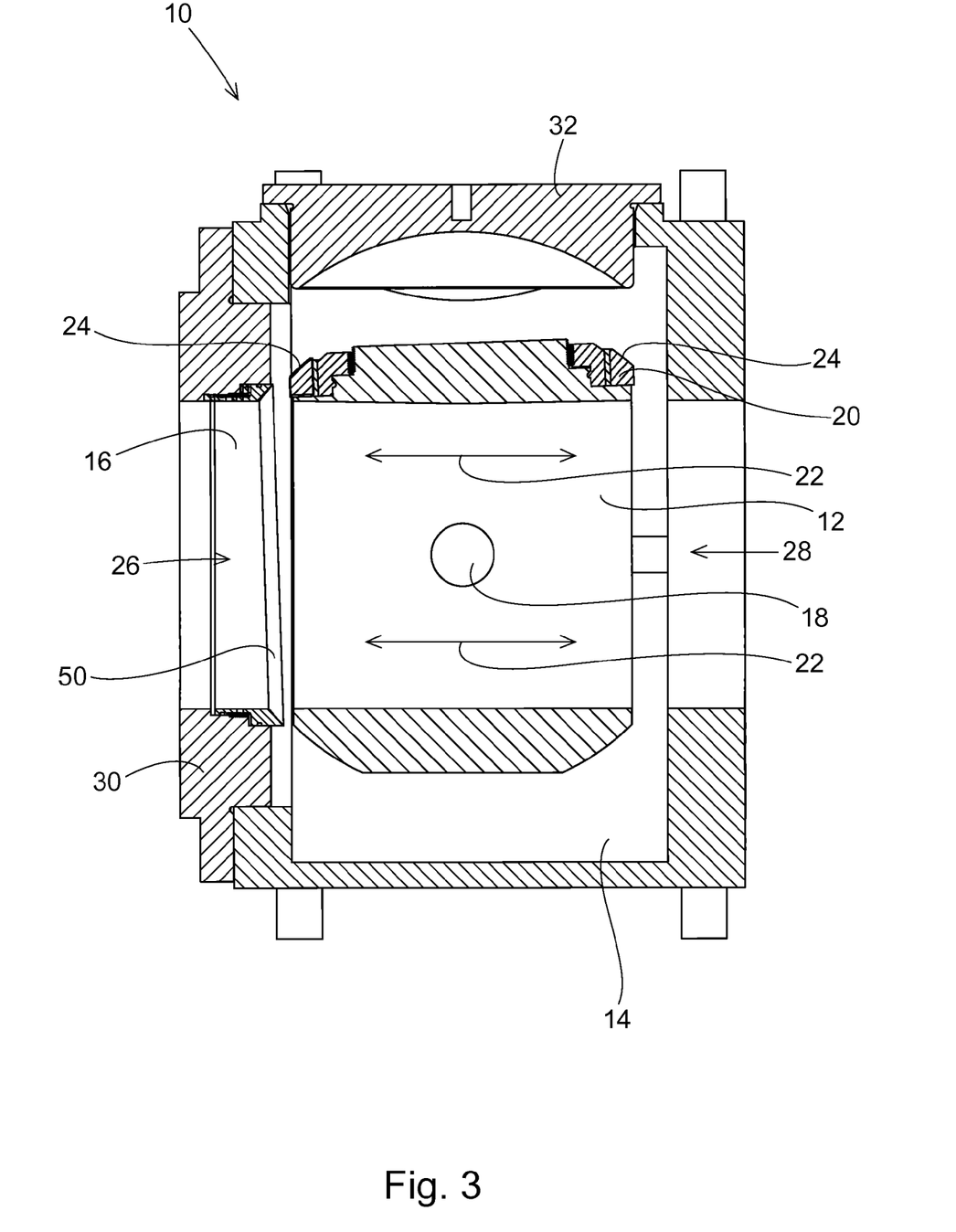
FIG. 3 illustrates a cross-sectional view of the ball valve shown in FIGS. 1 and 2, taken about the line 3-3 shown in FIG. 2, and is shown with the gate in the open position.
Figure 4:
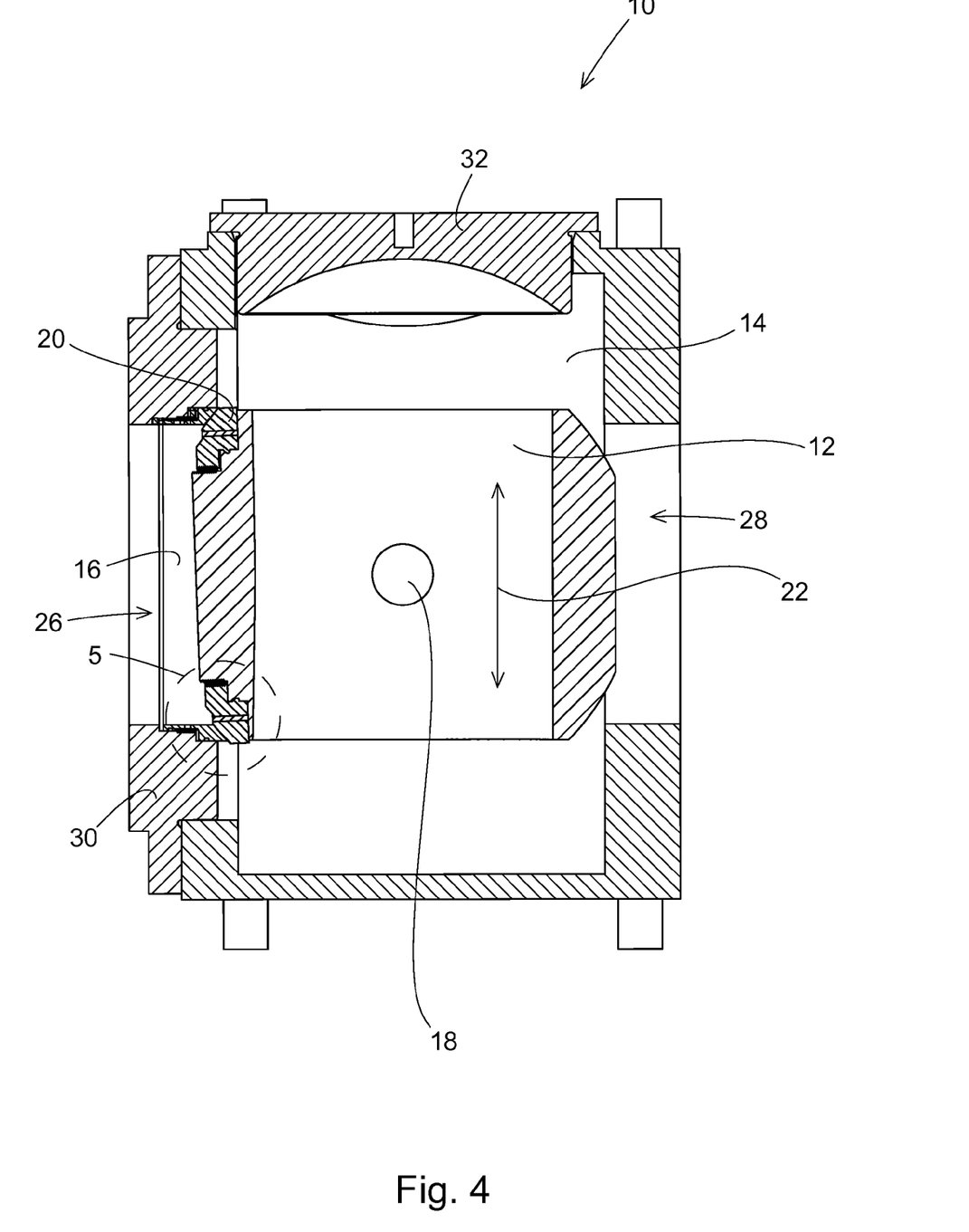
FIG. 4 illustrates a cross-sectional view of the ball valve shown in FIGS. 1 and 2, taken about the line 4-4 shown in FIG. 2, and is shown with the gate in the closed position.
Figure 5:
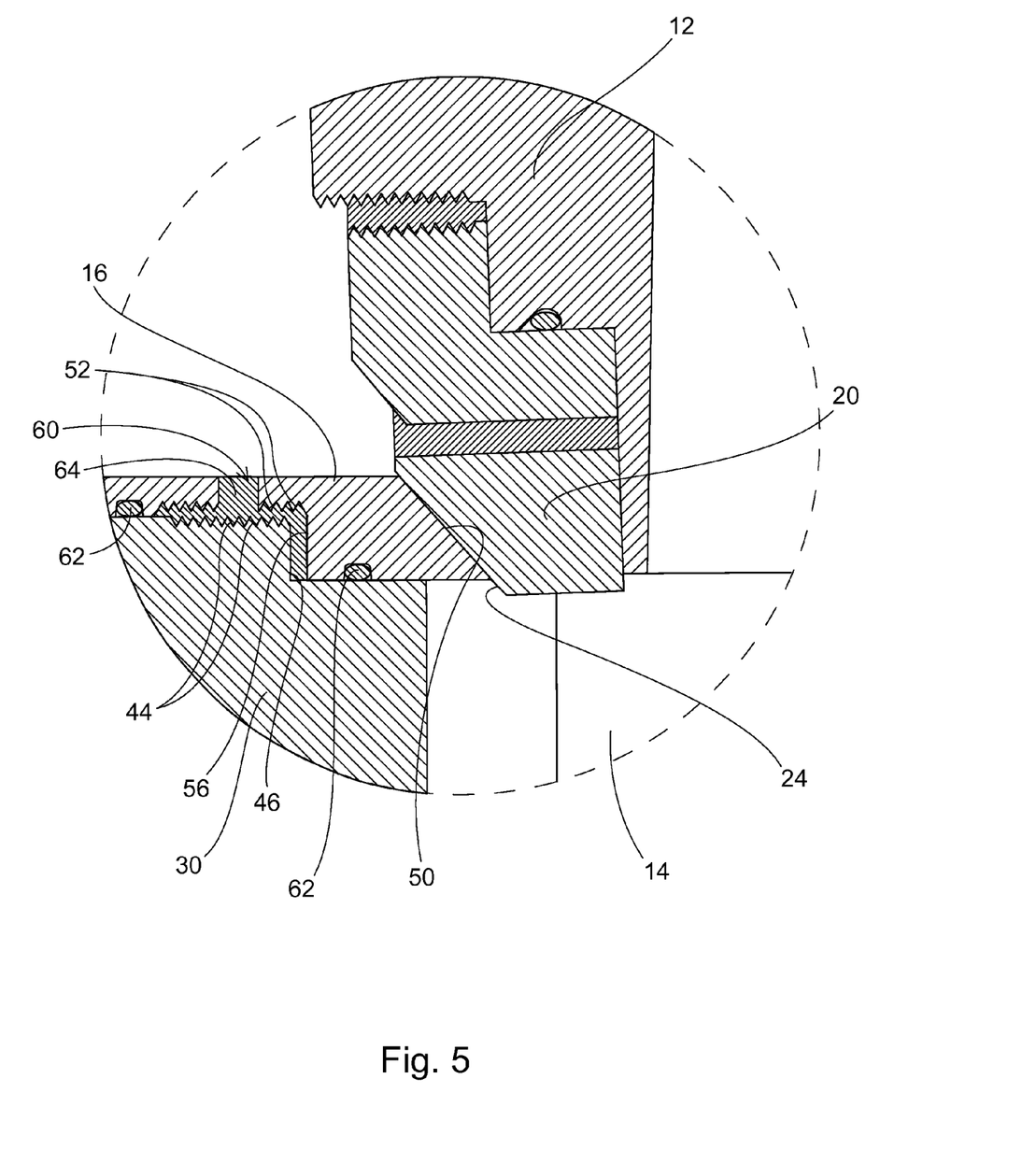
FIG. 5 illustrates a detail view of FIG. 4, as indicated in FIG. 4.
Figure 6:
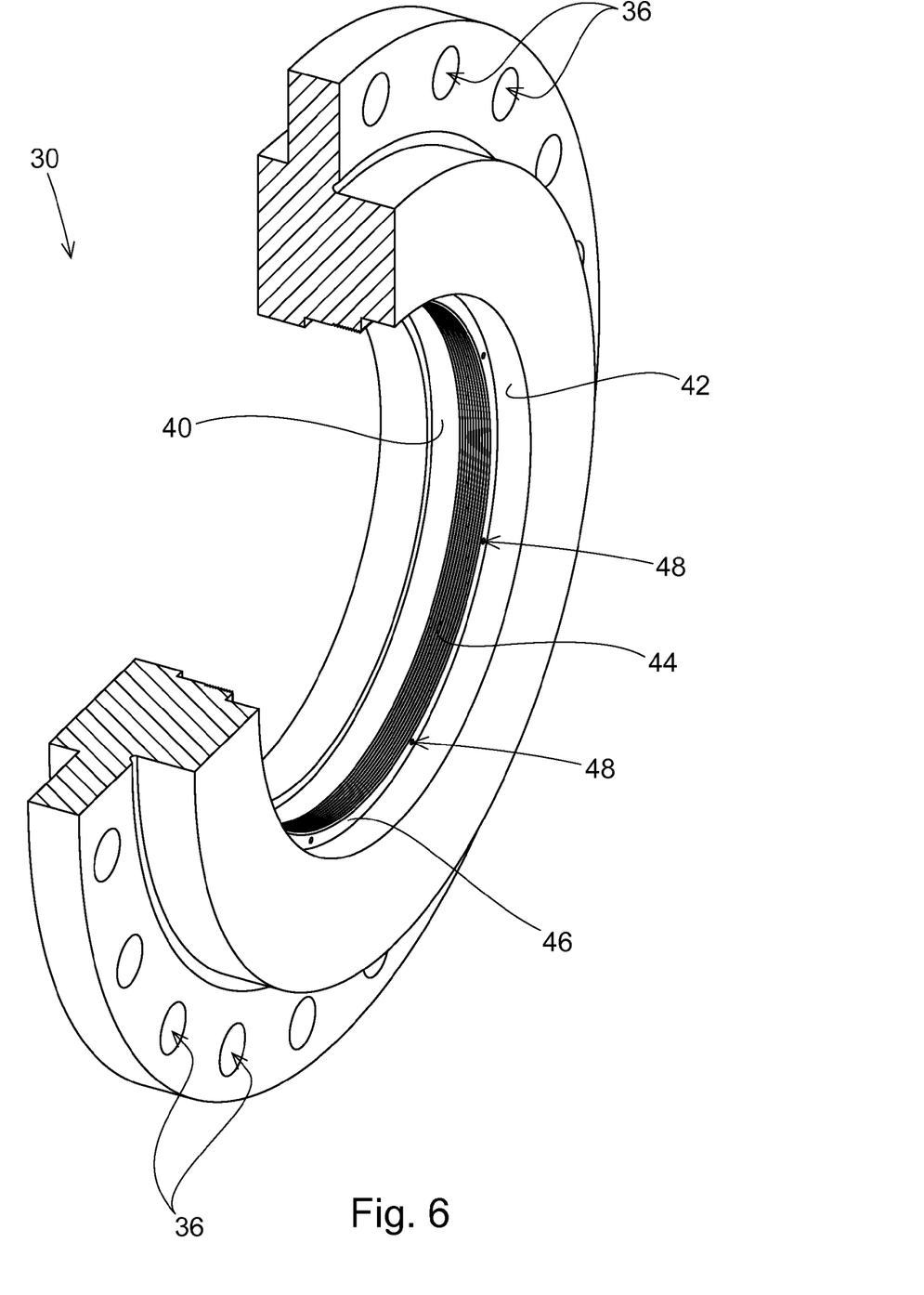
FIG. 6 illustrates a breakaway perspective view of the housing seat retainer of the ball valve shown in FIGS. 1-4.

The housing seat retainer 30 preferably forms the fluid inlet 26 of the valve 10 and connects the housing seat 16 to the remainder of the housing 14. The housing seat retainer 30 is configured such that it is removable from the remainder of the housing 14 so as to allow the housing seat 16, and sometimes the housing seat retainer itself as well, to be replaced. Preferably bolts (not shown) are used to secure the housing seat retainer 30 to the remainder of the housing 14. FIG. 6 depicts the housing seat retainer 30 by itself, from the opposite side of how it is shown in FIG. 1. The housing seat retainer 30 comprises a plurality of housing through-holes 36 for securing the housing seat retainer 30 to the housing 14, and a plurality of fluid line attachment blind-holes 38 for securing a flange of a fluid line to the valve 10. The housing seat retainer 30 also comprises first 40 and second 42 internal cylindrical sealing surfaces. A plurality of preferably V-shaped grooves adjacent the first cylindrical sealing surface 40 forms annular undulations 44. The undulations 44 terminate at a planar annular shelf 46, which extends to the second cylindrical sealing surface 42. A plurality of adjustment screw holes 48 extend through the housing seat retainer 30 to the annular shelf 46.

Figure 7:
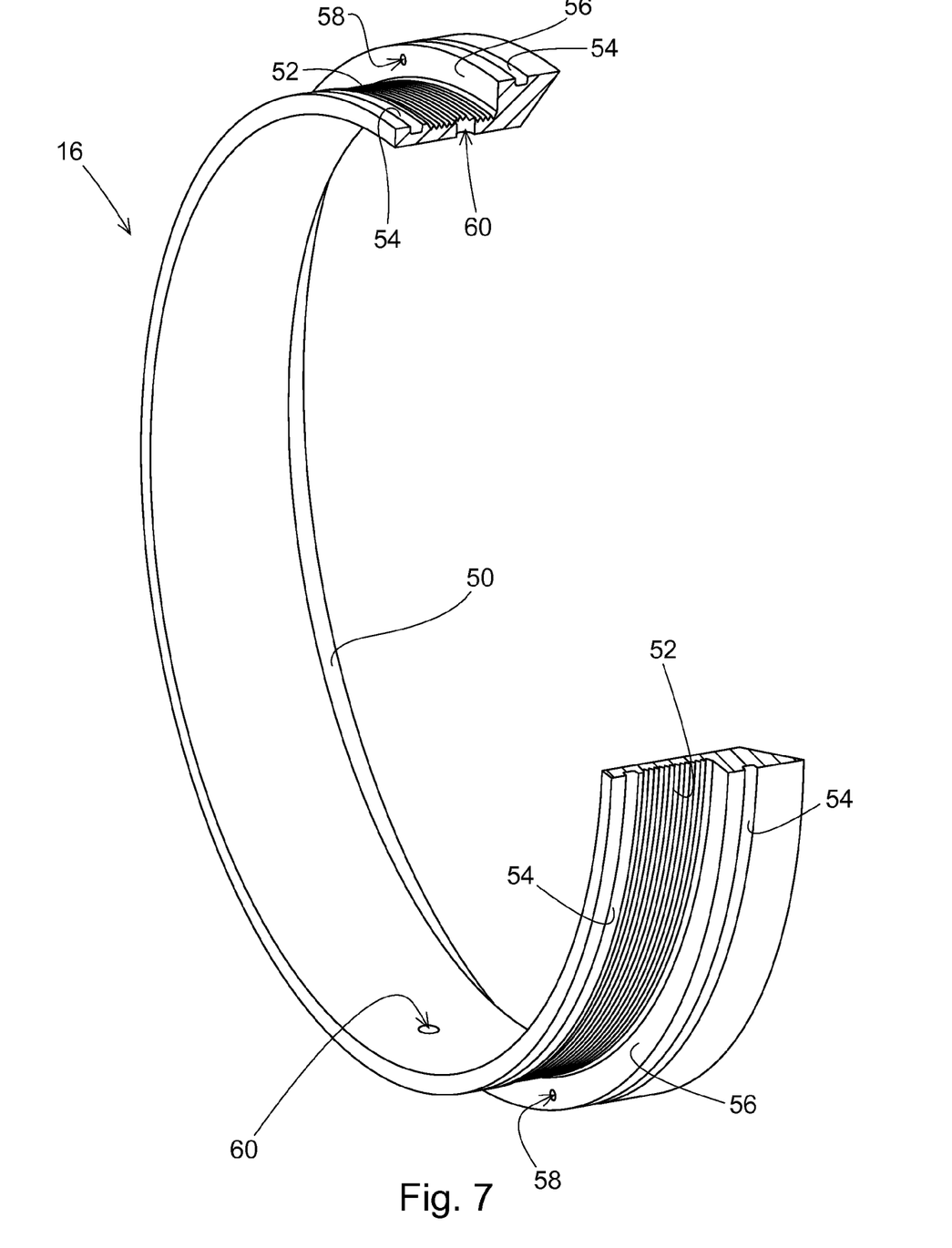
FIG. 7 illustrates a breakaway perspective view of the housing seat of the ball valve shown in FIGS. 1-4.

The housing seat 16 is shown by itself in FIG. 7 and comprises a sealing surface 50. The sealing surface preferably has the contour of a partial sphere, closely matching that of the sealing surface 24 of the gate seat 20. The housing seat 16 also comprises preferably V-shaped grooves that form external annular undulations 52. Additionally, two O-ring channels 54 are formed into the external surface of the housing seat 16 on axially opposite sides of the undulations 52. The housing seat 16 also has a planar annular shelf 56 that comprises a plurality of threaded blind-holes 58. Still further, a pair of epoxy ports 60 extend radially through the housing seat 16 between the O-ring channels 54.

Prior to installation into the housing 14 of the valve 10, resilient O-rings 62 are positioned in the O-ring channels 54 of the housing seat 16 and then the housing seat is initially secured to the housing seat retainer 30. This is done with the housing seat retainer 30 disconnected from the housing 14. During this procedure, the housing seat 16 is secured to the housing seat retainer 30 via a plurality of adjustment screws (not shown) which are inserted through the adjustment screw holes 48 of the housing seat retainer 30 and into the blind-holes 58 of the housing seat. Some of the screws act as push screws, which can be used to apply a force against the housing seat 16 in a direction away from the housing seat retainer 30, and some act as pull screws, which can be used to apply force to the housing seat in a direction toward the housing seat retainer. It should be appreciated that, in the case of the push screws, the adjustment screw holes 48 of the housing seat retainer 30 are preferably threaded while the blind-holes 58 of the housing seat 16 are preferably not, and that conversely, in the case of the pull screws, the adjustment screw holes of the housing seat retainer are preferably not threaded while the blind-holes of the housing seat preferably have threads. It should also be appreciated that other forms of adjustment screws can serve the same purpose. Assembled as described, one of the O-rings 62 sealably engages against the first cylindrical sealing surface 40 of the housing seat retainer 30, and the other sealably engages against the second cylindrical sealing surface 42 of the housing seat retainer 30. Additionally, the undulations 44 of the housing seat retainer 30 and the undulations 52 of the housing seat 16 face each other in a radially spaced apart manner. Still further, the shelf 46 of the housing seat retainer 30 faces the shelf 56 of the housing seat 16 in an axially spaced apart manner.

The installation procedure continues by placing the above-described assembly against the housing 14, with the housing seat 16 extending into the housing. The housing seat retainer 30 is then secured, via bolts passing through the housing holes 36 and into the housing 14. With the gate 12 in the closed position, the adjusting screws are then used to adjust the position of the housing seat 16 relative to the housing 14 in a manner such that the sealing surface 50 of the housing seat makes full annular contact with the sealing surface 24 of the gate seat 20 and such that a sufficient and uniform force exists therebetween to create an effective fluid seal. Once proper alignment and contact pressure is achieved, liquid epoxy is injected into the space that lies between the housing seat retainer 30 and the housing seat 16 and between the O-rings 62. This is preferably done by injecting epoxy into the lower epoxy port 60 of the housing seat 16 while allowing air and epoxy to escape through the higher epoxy port. During this process, the O-rings 62 act as dams to prevent the flow of epoxy past the O-rings. This preferably continues until it appears that the space is sufficiently devoid of air, after which time the epoxy ports are sealed and the epoxy is allowed to cure into solid form. Once cured, the adjustment screws are preferably removed such that contact pressure exerted on the sealing surface 50 of the housing seat 16 is borne by compression of the cured epoxy 64 between the shelf 46 of the housing seat retainer 30 and the shelf 56 of the housing seat 16, and by shear through the cured epoxy between the undulations 44, 52. This ensures that there is no point loading which could warp the housing seat 16 over time. It should also be appreciated that the undulations 44, 52 create interlocking geometry with the epoxy 64 that lies therebetween. While not necessarily necessary, the interlocking geometry ensures that no slippage can occur between the epoxy 64 and either the housing seat retainer 30 or the housing seat 16.

After the above describe procedures have been preformed, the valve 10 can be reattached to a fluid line and put into service. It should be appreciated that the procedure can be used in connection with either a new valve and an original housing seat, or replacing the housing seat 16 of a used valve.

In view of the foregoing, it should be appreciated that several advantages of the invention are achieved and attained.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A valve comprising:
   a housing, the housing comprising a fluid inlet, a fluid outlet, and an annular seat retainer, the annular seat retainer comprising an annular planar shelf that faces toward one the fluid outlet and the fluid inlet and away from the other of the fluid outlet and the fluid inlet;
   an anular housing seat, the housing seat comprising an annular planar shelf that faces toward the shelf of the annular seat retainer and is spaced therefrom, the housing seat being fixed in position relative to the housing via epoxy with the epoxy extending between the shelf of the annular seat retainer and the shelf of the housing seat, at least one epoxy port extending through the housing seat for injecting the epoxy; and
   a gate comprising a gate seat and a fluid passageway that extends through the gate, the gate being movable relative to the housing between an open position and a closed position, the gate being configured to allow fluid to flow from the fluid inlet through the fluid passageway to the fluid outlet when the gate is in the open position, the gate being configured such that the gate seat engages the housing seat in a manner preventing fluid from flowing from the fluid inlet to the fluid outlet when the gate is in the closed position, contact force acting on the housing seat as a result of the gate seat engaging the housing seat being borne by compression of the epoxy between the shelf of the annular seat retainer and the shelf of the housing seat.

2. A valve in accordance with claim 1 wherein the housing seat comprises annular undulations, and wherein there is interlocking geometry between the annular undulations and the epoxy.

3. A valve in accordance with claim 2 wherein the housing comprises annular undulations, and wherein there is interlocking geometry between the annular undulations of the housing and the epoxy.

4. A valve in accordance with claim 3 wherein the annular undulation of the housing are formed in the housing seat retainer and the housing seat retainer is removably secured to the valve along with the housing seat.

5. A valve in accordance with claim 1 wherein the housing seat is formed of steel.

6. A valve in accordance with claim 1 wherein the gate pivots about an axis relative to the housing as the gate moves between the first position and the second position, and wherein the housing seat and the gate seat are positioned to one side of the axis when the gate is in the closed position.

7. A valve in accordance with claim 1 further comprising first and second elastomeric rings, and wherein each of the elastomeric rings is positioned radially between the housing seat and the housing, and the epoxy extends between the elastomeric rings and between the housing seat and the housing.

8. A valve in accordance with claim 1 wherein the gate seat contacts a surface of the housing seat when the gate is in the closed position, and wherein the surface of the housing seat forms a portion of a sphere.

9. A method comprising:
   positioning a housing seat within a valve, the valve comprising a housing and a gate, the housing comprising a fluid inlet, a fluid outlet, and an annular seat retainer, the annular seat retainer comprising an annular planar shelf that faces toward one of the fluid outlet and the fluid inlet and way from the other of the fluid outlet and the fluid inlet, the housing seat comprising an annular planar shelf that faces toward the shelf of the annular seat retainer and is spaced therefrom, the gate comprising a gate seat and a fluid passageway, the gate being movable relative to the housing between an open position and a closed position, the gate being configured to allow fluid to flow from the fluid inlet through the fluid passageway to the fluid outlet when the gate is in the open position, the positioning comprising moving the housing seat to a sealing position relative to the housing via the use of adjusting screws connecting the housing seat to the housing;
   securing the housing seat in the sealing position relative to the housing via epoxy injected into at least one epoxy port extending through the housing seat in a manner such that epoxy extends between the shelf of the annular seat retainer and the shelf of the housing seat, the gate being configured such that the gate seat engages the housing seat in a manner preventing fluid from flowing from the fluid inlet to the fluid outlet when the gate is in the closed position and the housing seat is in the sealing position; and
   removing the adjusting screws from the valve, after the step of securing the housing seat in the sealing position relative to the housing via epoxy, in a manner such that contact force acting on the housing seat as a result of the gate seat engaging the housing seat is borne by compression of the epoxy between the shelf of the annular seat retainer and the shelf of the housing seat.

10. A method in accordance with claim 9 wherein the gate is in the closed position and the housing seat is engaged against the gate seat during the step of securing the housing seat in the sealing position relative to the housing via the epoxy.

11. A method in accordance with claim 9 wherein the housing seat comprises annular undulations, and wherein the step of securing the housing seat in the sealing position relative to the housing via the epoxy occurs in a manner such that there is interlocking geometry between the annular undulations and the epoxy.

12. A method in accordance with claim 9 wherein the valve comprises first and second elastomeric rings that are spaced apart and are engaged with the housing seat and the housing, and wherein the step of securing the housing seat in the sealing position relative to the housing via the epoxy comprises injecting the epoxy in liquid form into a space between the first and second elastomeric rings.

13. A method in accordance with claim 12 wherein each of the first and second elastomeric rings acts as a dam in a manner containing the epoxy when the epoxy is in liquid form.

* * * * *